(12) United States Patent
Piecko (10) Patent No.: US 10,657,111 B2
(45) Date of Patent: May 19, 2020

(54) COMPUTER-IMPLEMENTED METHOD FOR STORING UNLIMITED AMOUNT OF DATA AS A MIND MAP IN RELATIONAL DATABASE SYSTEMS

(71) Applicant: DataWalk Spółka Akcyjna, Wroclaw (PL)

(72) Inventor: Krystian Piecko, Wroclaw (PL)

(73) Assignee: DataWalk Spółka Akcyjna, Wroclaw (PL)

( * ) Notice: Subject to any disclaimer, the term of this patent is extended or adjusted under 35 U.S.C. 154(b) by 124 days.

(21) Appl. No.: 15/866,713

(22) Filed: Jan. 10, 2018

(65) Prior Publication Data

US 2018/0203884 A1    Jul. 19, 2018

Related U.S. Application Data

(63) Continuation of application No. 14/222,795, filed on Mar. 24, 2014, now Pat. No. 10,002,143.

(30) Foreign Application Priority Data

Mar. 29, 2013   (EP) ..................... 13461516

(51) Int. Cl.
  *G06F 16/00*   (2019.01)
  *G06F 16/21*   (2019.01)
(52) U.S. Cl.
  CPC .......... *G06F 16/211* (2019.01); *G06F 16/213* (2019.01)
(58) Field of Classification Search
  CPC ............................. G06F 16/211; G06F 16/213
  See application file for complete search history.

(56) References Cited

U.S. PATENT DOCUMENTS 5,257,349 A   10/1993   Alexander
5,418,961 A    5/1995   Segal et al.
(Continued)

FOREIGN PATENT DOCUMENTS

EP       0592046 A2     4/1994
EP       2455869 A1     5/2012
WO    WO-02059793 A3    4/2003

OTHER PUBLICATIONS

Office action dated Feb. 11, 2016 for U.S. Appl. No. 14/222,795.
(Continued)

*Primary Examiner* — Jared M Bibbee
(74) *Attorney, Agent, or Firm* — Wilson Sonsini Goodrich & Rosati (57) ABSTRACT

A computer implemented method for creating and managing a database system comprising data structures for storing, in a memory, data and relations between the data, the method comprising the steps of creating a mind map structure wherein each node of the mind map represents a set in the first data structure and each branch represents a relation in the fifth data structure of the database in which there are defined five data structures that hold all information relating to tables, records and relations, namely: a first data structure comprising a definition of at least one data set, a second data structure comprising definitions of properties of objects, a third data structure comprising definitions of objects, a fourth data structure comprising definitions of properties of each object, a fifth data structure comprising definitions of relations and a sixth data structure for storing definitions of relations between objects.

20 Claims, 7 Drawing Sheets

(56) References Cited

U.S. PATENT DOCUMENTS

| | | | |
|---|---|---|---|
| 5,548,758 A | 8/1996 | Pirahesh et al. | |
| 5,604,899 A * | 2/1997 | Doktor | G06F 16/288 |
| 6,038,566 A * | 3/2000 | Tsai | G06F 16/9558 |
| 6,105,035 A * | 8/2000 | Monge | G06F 9/4492 |
| 6,163,775 A | 12/2000 | Wlaschin et al. | |
| 6,192,371 B1 * | 2/2001 | Schultz | G06F 16/289 |
| 6,934,712 B2 | 8/2005 | Kiernan et al. | |
| 6,947,945 B1 * | 9/2005 | Carey | G06F 16/8358 |
| 6,986,102 B1 | 1/2006 | Baer et al. | |
| 7,058,622 B1 | 6/2006 | Tedesco | |
| 7,243,106 B2 | 7/2007 | Vierich et al. | |
| 7,363,593 B1 * | 4/2008 | Loyens | G06F 16/26 715/853 |
| 7,895,191 B2 | 2/2011 | Colossi et al. | |
| 8,103,703 B1 * | 1/2012 | Jetter | G06Q 10/10 707/805 |
| 8,224,829 B2 | 7/2012 | Pauly | |
| 8,364,623 B1 * | 1/2013 | Bunker | G06Q 10/06 706/47 |
| 8,386,920 B2 | 2/2013 | Cox et al. | |
| 8,793,246 B1 | 7/2014 | Mathur et al. | |
| 8,874,621 B1 | 10/2014 | Goodwin et al. | |
| 9,218,380 B2 | 12/2015 | Adzic et al. | |
| 9,483,508 B1 | 11/2016 | Wilkes et al. | |
| 9,747,312 B2 | 8/2017 | Piecko | |
| 10,002,143 B2 | 6/2018 | Piecko et al. | |
| 2001/0051948 A1 | 12/2001 | Srinivasan et al. | |
| 2002/0029209 A1 | 3/2002 | Bernal et al. | |
| 2003/0088545 A1 | 5/2003 | Subramaniam et al. | |
| 2003/0208493 A1 * | 11/2003 | Hall | G06F 16/289 |
| 2003/0229640 A1 * | 12/2003 | Carlson | G06F 16/24553 |
| 2004/0088283 A1 | 5/2004 | Lissar et al. | |
| 2004/0133581 A1 | 7/2004 | Shinjo | |
| 2004/0139102 A1 * | 7/2004 | Vierich | G06F 16/2425 |
| 2004/0255301 A1 | 12/2004 | Turski et al. | |
| 2005/0039033 A1 | 2/2005 | Meyers et al. | |
| 2005/0216503 A1 | 9/2005 | Charlot et al. | |
| 2005/0228818 A1 | 10/2005 | Murthy et al. | |
| 2006/0173841 A1 * | 8/2006 | Bill | G01C 21/3407 |
| 2006/0288035 A1 | 12/2006 | Viavant | |
| 2007/0112803 A1 | 5/2007 | Pettovello | |
| 2007/0198557 A1 * | 8/2007 | Ching | G06F 16/289 |
| 2008/0021864 A1 | 1/2008 | Bakalash et al. | |
| 2008/0033987 A1 | 2/2008 | Carter | |
| 2008/0183658 A1 | 7/2008 | Mangipudi | |
| 2008/0301181 A1 | 12/2008 | Lori | |
| 2009/0103715 A1 | 4/2009 | Thorbjornsson | |
| 2009/0222408 A1 | 9/2009 | Charles et al. | |
| 2010/0287212 A1 | 11/2010 | Becker | |
| 2010/0299348 A1 | 11/2010 | Gill et al. | |
| 2011/0231438 A1 | 9/2011 | Pfeifle et al. | |
| 2012/0096002 A1 * | 4/2012 | Sheehan | G06Q 10/10 707/737 |
| 2012/0117027 A1 | 5/2012 | Shau et al. | |
| 2012/0246147 A1 | 9/2012 | Lamb et al. | |
| 2012/0284635 A1 | 11/2012 | Sitrick et al. | |
| 2013/0083104 A1 | 4/2013 | Mitsuki | |
| 2013/0086104 A1 | 4/2013 | Morrison et al. | |
| 2013/0091180 A1 | 4/2013 | Vicat-Blanc-Primet et al. | |
| 2013/0144917 A1 * | 6/2013 | Hosurmath | G06Q 10/06 707/803 |
| 2013/0307843 A1 | 11/2013 | Sikka et al. | |
| 2013/0311518 A1 | 11/2013 | Agbaria | |
| 2014/0046983 A1 | 2/2014 | Galloway et al. | |
| 2014/0297693 A1 | 10/2014 | Piecko | |
| 2015/0006507 A1 | 1/2015 | Piecko | |
| 2015/0066986 A1 | 3/2015 | Piecko | |
| 2018/0018357 A1 | 1/2018 | Piecko | |

OTHER PUBLICATIONS

Office Action dated Apr. 28, 2017 for U.S. Appl. No. 14/222,795.
Office action dated Jun. 2, 2016 for U.S. Appl. No. 14/222,795.
Office Action dated Sep. 22, 2016 for U.S. Appl. No. 14/222,795.
U.S. Appl. No. 14/222,795 Notice of Allowance dated Jan. 29, 2018.
U.S. Appl. No. 14/315,481 Office Action dated May 17, 2018.
Anonymous: II sql—Relational database design question—Surrogate-key or Natural-key?—Stack Overflow, Sep. 19, 2010 (Sep. 19, 2010), XP055109921, Retrieved from the Internet: URL:http://stackoverflow.com/questions/3747730/relational-database-design-question-surrogate-key-or-natural-key [retrieved on Mar. 25, 2014] "see answer from Mitch Dempsey".
European Patent Office Search Report; Re. Application No. 13461516.0-1951 Report dated Jul. 30, 2013.
European Patent Office Search Report; Re. Application No. 13461536.8-1951 Report dated Sep. 10, 2013.
European Patent Office Search Report; Re. Application No. 13461545.9-1952 Report dated Apr. 25, 2014.
European Patent Office Search Report; Re. Application No. 13461546.7-1952 Report dated Apr. 11, 2014.
Notice of Allowance dated Apr. 10, 2017 for U.S. Appl. No. 14/469,968.
Notice of Allowance dated Apr. 28, 2017 for U.S. Appl. No. 14/469,968.
Notice of Allowance dated Jul. 26, 2017 for U.S. Appl. No. 14/469,968.
Notice of Allowance dated Dec. 19, 2017 for U.S. Appl. No. 14/222,795.
Office Action dated Mar. 13, 2017 for U.S. Appl. No. 14/315,481.
Office Action dated May 26, 2017 for U.S. Appl. No. 14/469,958.
Office Action dated Jul. 3, 2017 for U.S. Appl. No. 14/315,481.
Office action dated Aug. 22, 2016 for U.S. Appl. No. 14/315,481.
Office action dated Aug. 26, 2016 for U.S. Appl. No. 14/469,968.
Office action dated Sep. 12, 2016 for U.S. Appl. No. 14/469,958.
Office Action dated Dec. 21, 2016 for U.S. Appl. No. 14/469,968.
Girvan et al. Community structure in social and biological networks. Proc Natl Acad Sci U S A. Jun. 11, 2002; 99(12): 7821-7826.
U.S. Appl. No. 14/315,481 Notice of Allowance dated Nov. 28, 2018.
U.S. Appl. No. 14/469,958 Notice of Allowance dated Jun. 29, 2018.

* cited by examiner

COMPUTER-IMPLEMENTED METHOD FOR STORING UNLIMITED AMOUNT OF DATA AS A MIND MAP IN RELATIONAL DATABASE SYSTEMS

CROSS-REFERENCE TO RELATED APPLICATIONS

This application is a continuation claiming priority to U.S. patent application Ser. No. 14/222,795, filed Mar. 24, 2014, which claims the benefit of priority under 35 U.S.C. 119 (a), (b) of European Patent Application No. 13461516.0, filed Mar. 29, 2013, each of which is entirely incorporated herein by reference.

TECHNICAL FIELD

The disclosure is related to computer-implemented methods and systems for creating and/or managing a database.

BACKGROUND

The database is a data storage concept evolving for decades since the 1960s to ease increasing difficulties in designing, building, and maintaining complex information systems (multi-user systems with a large amount of data). Another term directly related to databases is a database management system (DBMS), which enables the effective handling of databases. It shall nevertheless be noted that the terms database and DBMS define different entities, they may be inseparable: a database's properties may be determined by its supporting DBMS. A DBMS is presently a complex software system such as general-purpose DBMSs, like Oracle or Microsoft SQL Server.

Techniques exist for computer-implemented methods and systems for creating and managing a database. In particular there are three major DBMS approaches widely used in the industry, e.g., relational databases, object databases and graph databases.

A relational database is a collection of data items organized as a set of formally described tables from which data can be accessed easily. A relational database may be created using the relational model. The software used in a relational database is called a relational database management system (RDBMS). A relational database may be a dominant choice for many data storage applications. An RDBMS may comprise of n number tables in which, for example, each table has its own primary key. The relational database was first defined in June 1970 by Edgar Codd, of IBM's San Jose Research Laboratory.

A problem with a relational database may be the complexity that arises when the relational database is created. It is generally important that defined relationships among the tables are correct and that each set of information is linked to its pair. Although less information has to be entered in total than with other database approaches, verifying that points are set up correctly may be a time-consuming process. Furthermore, the relationships can become complicated when a relational database comprises numerous tables.

An object database (also object-oriented database management system or OODBMS) is a database management system comprising information represented in the form of objects as used in object-oriented programming. Object databases may be different from relational databases and belong together in a broader database management system.

An object database may store complex data and relationships between data directly, without mapping to relational rows and columns, which may make object databases suitable for applications in which complex data may be encountered. Objects may have a many to many relationship and are accessed by the use of pointers. Pointers may be linked to objects to establish relationships. Another benefit of an OODBMS may be that an OODBMS may be programmed with small procedural differences without affecting the entire system. This may be helpful for those organizations in which data relationships may be used that are not entirely clear or there is a need to change these relations to satisfy a new business requirement.

Disadvantages of object databases may include lower efficiency when data is simple and relationships are simple, late binding may slow access speed, data and operations being separated, low responsiveness to changes in problem space, and inadequate design for concurrent problems, for example.

Over the years there have been designed hybrid object-relational databases. For example a pre-grant publication US 2003/0208493 A1 entitled "Object Relational Database Management System" appears to disclose an object relational database management system permitting a client application to access one or more data sources. A client application may direct queries to an object server component to obtain data from the data sources. An object server component may operate with an object definition component which may fulfill the queries. An object definition component may access an object definition database to obtain and use metadata, in the form of programmatic objects, about the location and structure of the data stored in the data sources. An optional object manager component may, for example, work with the object definition component to edit and create new metadata or, via the object server component, to work with and create new instances of the data sources.

As it pertains in particular to graph databases, such databases may depart from traditional storage and definitions paradigms. Many software developers may have experience with storing data in tabular form in a relational database. Such approaches may work well for some applications, but presently may begin to show drawbacks. Relational databases, for example, may exhibit difficulties in scaling. Unfortunately, more and more of today's innovative applications may involve massive data to be processed. In some instances, such large data processing requirements may expose a need for new approaches such as Graph Databases. For example, tables, such as tables used in relational databases, may be difficult to implement in Web-based environments. Since the Web may be characterized as collection of pages that are hyperlinked, not identically-shaped rows in a gigantic table, a graph database may more closely accord with present-day Web architectures. A graph, as known from mathematics, or as informally drawn by most engineers on whiteboards, may be a much more natural representation for data that is native to the web. Given that much of the data processed by today's innovative applications may exist elsewhere, the time of stovepipe applications may past. Additionally, some applications may not own a substantial percentage of their own data, such as some social feed aggregators.

A pre-grant publication number US2012096002 entitled "SYSTEMS AND METHODS FOR GENERATING AND MANAGING A UNIVERSAL SOCIAL GRAPH DATABASE," appears to disclose a computer-implemented method for determining connections between entities that includes receiving private information from a user, retrieving public information from publicly available sources, and matching the public information with the private information. The method also includes generating a graph database with the public and private information, determining connections among entities in the graph database, and determining strength of connectivity between entities in the graph database. The disclosure appears to provide a system that tracks public and private connections between people and provides connection and profile information as a software platform via the Internet and at least one application programming interface. The system appears to implement or generate at least one graph database. The graph database may be updated in real time. Such a system may be capable of being used on a large scale to power cloud or software as a service based application that services simultaneous users and run simultaneous algorithms.

From known databases, such as ORACLE®, there is known an ALTER command. The process of modifying database structures directly requires locking a database structure that will be modified. There is also a related LOCK command that effectuates a freeze of a database structure for the time of modification such as adding, searching for or modifying records of a given table.

In production, end-user database systems, may make use of special scripts utilizing special triggers, which execute ALTER and/or LOCK commands automatically.

In some instances, an operation of adding a column to a database may lock a table. Further, an ALTER command may close currently executing data processing tasks such as transactions. This may render processing operations executing with varying number of parameters to be ineffective and may potentially threaten integrity of data gathering. Further, if data are collected very quickly, the size of a data buffer may be insufficient.

The use of the aforementioned commands in databases that are updated very frequently may be problematic in that such approaches may require databases to stop certain services. Hence it may also be beneficial to create a database system that does not require to stop the aforementioned services when, for example, a new column is to be added to an existing table.

Drawbacks of known graph databases include, for example, increased memory requirements and difficulties in presenting information to a user in a clear way. Further drawbacks of current database systems include lack of possibility of extending database in real time and difficulties in understanding how a complex database is designed.

Taking into account the present techniques there is a need to design and implement an efficient database model that is especially adapted to large scale databases, is easily scalable and has reduced memory requirement in comparison to graph, relational or object-oriented databases.

Up to now such problems have been addressed with a use of more powerful hardware such as database servers having higher performance and more memory instead of solutions related to design of the databases.

SUMMARY

Briefly, particular embodiments may be directed to a computer implemented database system comprising data structures for storing, in a memory, data and information defining relations between the data. In an embodiment, the system may further comprise a first data structure, stored in the memory, comprising a definition of at least one data set wherein each data set comprises a data set identifier and logically holds data objects of the same type; a second data structure, stored in the memory, comprising definitions of properties of objects wherein each property comprises an identifier of the property and an identifier of a set, from the first data structure, the property is assigned to; a third data structure, stored in the memory, comprising definitions of objects wherein each object comprises an identifier and an identifier of a set, from the first data structure, the object is assigned to; a fourth data structure, stored in the memory, comprising definitions of properties of each object wherein each property of an object associates a value with an object, from the third data structure, and a property identifier, from the second data structure, the object is assigned to; a fifth data structure, stored in the memory, comprising definitions of relations wherein each relation comprises an identifier of the relation; and a sixth data structure, stored in the memory, for storing definitions of relations between objects wherein each objects relation associates a relation, from the fifth data structure, to two objects from the third data structure.

In some embodiments, a system may comprise a further property of name assigned to each entry in the first data structure to the second data structure and to the fifth data structure.

Advantageously, in some embodiments, the system comprises a seventh data structure, stored in the memory, for storing definitions of relations between sets wherein each sets relation associates a relation, from the fifth data structure, to two sets from the first data structure.

In an embodiment, a computer implemented method for creating and managing a database system comprising data structures for storing, in a memory, data and relations between the data, comprises the steps of creating a first data structure, stored in the memory, comprising a definition of at least one data set wherein each data set comprises a data set identifier and logically holds data objects of the same type; creating a second data structure, stored in the memory, comprising definitions of properties of objects wherein each property comprises an identifier of the property and an identifier of a set, from the first data structure, the property is assigned to; creating a third data structure, stored in the memory, comprising definitions of objects wherein each object comprises an identifier and an identifier of a set, from the first data structure, the object is assigned to; creating a fourth data structure, stored in the memory, comprising definitions of properties of each object wherein each property of an object associates a value with an object, from the third data structure, and a property of the set, from the second data structure, the object is assigned to; creating a fifth data structure, stored in the memory, comprising definitions of relations wherein each relation comprises an identifier of the relation; and creating a sixth data structure, stored in the memory, for storing definitions of relations between objects wherein each objects relation associates a relation, from the fifth data structure, to two objects from the third data structure.

In an embodiment, a computer implemented method for creating and managing a database system comprising data structures for storing, in a memory, data and relations between the data, comprises the steps of creating a mind map structure wherein each node of the mind map represents a set in the first data structure and each branch represents a relation in the fifth data structure of the database according to a first embodiment.

In some instances, the method, comprises the steps of assigning a name to each node of the mind map wherein each name of respective node is the name property of a record of the first data structure; and assigning a name to each branch of the mind map wherein each name of respective branch is the name property of the fifth data structure.

In some instances, the method, according to an embodiment, comprises the steps of assigning properties to each node of the mind map wherein each property is an entry in the second data structure.

In an embodiment of a method, the process of adding an object to the database comprises the steps of creating a new entry in the third data structure; for each object property of the given set defined in the second data structure, creating an entry in the fourth data structure.

In some instances a method, according to an embodiment, the process of adding an object to the database further comprises the steps of creating relations of the new object with existing objects by means of the sixth data structure.

In an embodiment, a method may involve a process of removing an object from the database, which may comprise the steps of identifying an object to be removed; fetching the unique identifier of the object to be removed; removing the object entry from the third data structure; removing all entries in the fourth data structure related to the object identifier being removed from the database.

A method may additionally comprise a process of removing an object from the database further, which may comprise steps of removing any existing relations of the removed object with other existing objects by means of deleting entries in the sixth data structure that relate to the object being removed.

A method embodying features of the present invention, may comprise computer software comprising program code means for performing all the steps of the computer-implemented method when said program is run on a computer.

An embodiment may comprise a computer readable recording medium for storing computer-executable instructions performing all the steps of the computer-implemented method when executed on a computer.

It should be understood that the aforementioned embodiments are merely example implementations, and that claimed subject matter is not necessarily limited to any particular aspect of these example implementations.

BRIEF DESCRIPTION OF FIGURES

These and other features presented herein are accomplished by providing a computer-implemented method and system for creating and managing a database. Further details and features, their nature and various advantages will become more apparent from the following detailed description of the preferred embodiments shown in a drawing, in which.

NOTATION AND NOMENCLATURE

Some portions of the detailed description which follows may be presented in terms of data processing procedures, steps or other symbolic representations of operations on data bits that can be performed on computer memory. Therefore, a computer executes such logical steps thus requiring physical manipulations of physical quantities. A computer-readable (storage) medium, such as referred to herein, typically may be non-transitory and/or comprise a non-transitory device. In this context, a non-transitory storage medium may include a device that is tangible, meaning that the device has a concrete physical form, although the device may change its physical state. Thus, for example, non-transitory refers to a device remaining tangible despite a change in state.

Usually these quantities take the form of electrical or magnetic signals capable of being stored, transferred, combined, compared, and otherwise manipulated in a computer system. For reasons of common usage, these signals are referred to as bits, packets, messages, values, elements, symbols, characters, terms, numbers, or the like.

Additionally, all of these and similar terms are to be associated with the appropriate physical quantities and are merely convenient labels applied to these quantities. Terms such as "processing" or "creating" or "transferring" or "executing" or "determining" or "detecting" or "obtaining" or "selecting" or "calculating" or "generating" or the like, refer to the action and processes of a computer system that manipulates and transforms data represented as physical (electronic) quantities within the computer's registers and memories into other data similarly represented as physical quantities within the memories or registers or other such information storage.

DESCRIPTION OF EMBODIMENTS

Relational databases are well established on the market but may suffer from drawbacks of difficult scalability and extending, being also combined with limited suitability for really complex databases where there are, for example, 100 tables and 200 relations, although claimed subject matter is not limited in this respect. In very complex database systems, for example a database listing comprising 100 tables and 200 relations, the designer of a particular database may need to be keenly aware of every single table and how data from a particular table may relate to data from the remaining 99 tables. Having this knowledge at hand for all 100 tables may be an enormous task.

Figure 1:
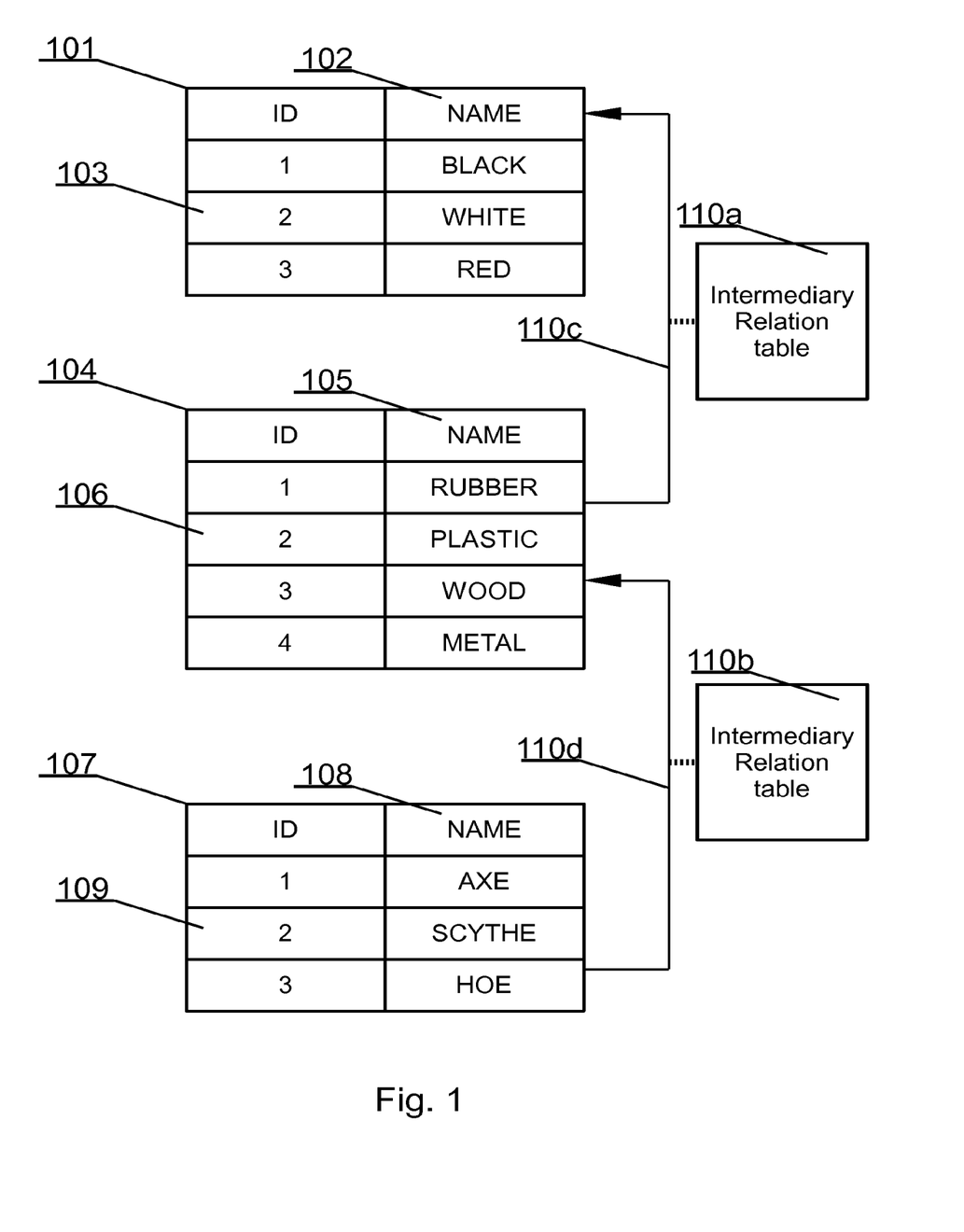
FIG. 1 presents an exemplary relational database.

FIG. 1 presents an exemplary, simple relational database schema. The database comprises three tables and two relations. The first table 101 may hold colors data and may comprise two columns, namely name of the color (NAME) 102 and identifier of the color (ID) 103. A second table 104 may hold materials data and may comprise two columns, namely name of the material (NAME) 105 and identifier of the material (ID) 106. A third table, namely table 107 may hold tools data and may comprise two columns, namely name of the tool (column→'NAME') 108 and identifier of the tool (column→'ID') 109. Second table 104 may link with first table 101 by way of link 110c and to intermediary relation table 110a.

Tables 101 and 107 may comprise three entries while table 104 has four entries. The colors table 101 and the materials table 104 may be related, which may be defined by means of a relation 100c. Table 107 may link with table 104 and with intermediary relation table 110b by way of link 110d.

Typically, one defines foreign keys in a database to model relationships in the real world. Relationships between real-world entities may often be complex, involving numerous entities each having multiple relationships with one another. For example, a family may have multiple relationships between multiple people. In addition all relationships may exist at the same time. In a relational database, however, there are considered only relationships between pairs of tables. These tables may be related in one of three different ways: one-to-one, one-to-many or many-to-many.

The relation 100c is for example many-to-many relation where a color may be assigned to many materials but at the same time a material may be assigned to many colors.

Such relation in a real database system may be implemented by using an intermediary relation table 100a that provides mapping between elements of each table.

On a similar technical basis, in FIG. 1, there is defined another relation between materials table and tools table 100d utilizing an intermediary relation Table 100b. The relation may be for example many-to-many relation where a material may be assigned to many tools but at the same time a tool may be assigned to many materials.

A relational database may therefore be summarized, at least in some embodiments, as follows: there are at least two sets of elements and at least one relation that defines how elements from the first set are related to the elements of the second set, whereas the relation involves creation of a data structure mapping elements of the first set to elements of the second set. Typically the mapping may be brought about by means of unique identifiers (within each set) of the elements in each set.

It has been observed, that many problems that a relational database designer faces with respect to awareness of the complete design are a result of presenting real life events and entities on a very complex tables and relations diagram.

Real life cases, however, be may suitably defined and presented by means of mind maps. Mind maps however, have not so far found their application in database systems.

In embodiments, a mind map is a diagram, which may be used to visually outline and present information. A mind map may be created around a single object but may additionally be created around multiple objects. Objects may have associated ideas, words and concepts. In some instances, the major categories radiate from each node, and lesser categories are sub-branches of larger branches. Categories can represent words, ideas, tasks, or other items related to a central key word or idea.

Hence, there is designed a system that can be easily outlined as a mind map and designed technically such that a mind map representation may easily be transferred to a databases system design level and data storage abstraction level.

Figure 2:
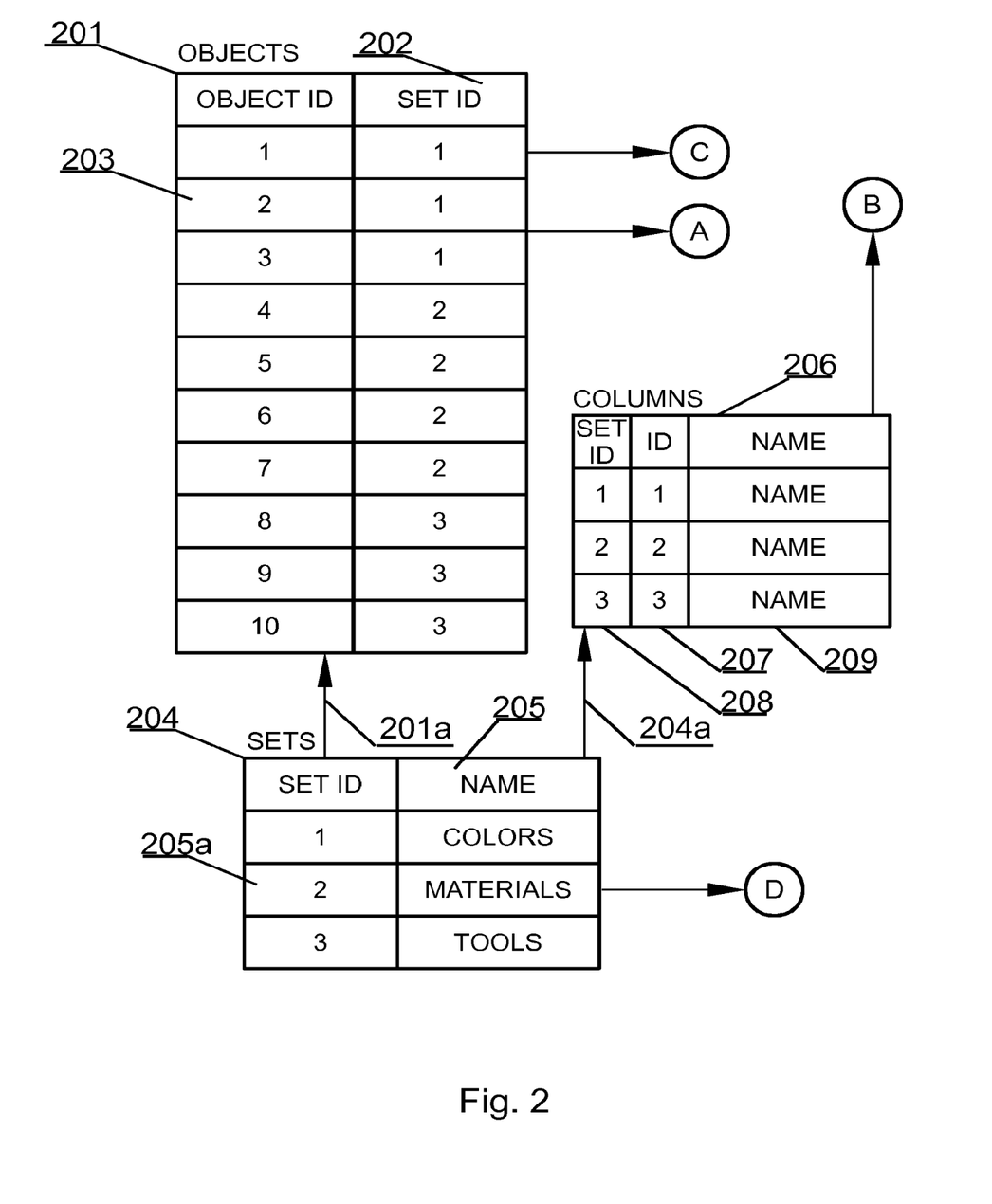
FIGS. 2 and 3 show a new database system.

FIG. 2 shows a new database system. In order to cooperate with mind maps, the database system has been designed differently than known database systems. The database system comprises six core sets of data and optional sets. The core sets comprise SETS, OBJECTS, COLUMNS, CHARACTERISTICS, RELATIONS and OBJECTS RELATIONS. It should be noted that the names above are exemplary only and the respective core sets are defined rather by their function within the system than their name.

In order to more easily understand differences between the relational database of FIG. 1 and the embodiments presented herein, the same database and its data will be also used in FIG. 2.

The first set of data is called SETS 204, because it may be used to logically hold data related to sets of data. Sets of data may be represented on a mind map as nodes. Each entry in a SETS data structure 204 may comprise at least a unique identifier 205a and may also comprise its name 205. Referring back to example from FIG. 1 there are three SETS, namely COLORS having ID of 1, MATERIALS having ID of 2 and TOOLS having ID of 3. The SETS data structure may be a top level structure and may not refer to other data structures, but other data structures may refer to the SETS data structure as identified by respective arrows between the sets of FIG. 2.

Each set of data may be, as in the real world, characterized by some properties typically referred to as columns. Hence, the second set of data may be called COLUMNS 206. A property, called typically a "column," may be uniquely identified with an identifier ID 207 and maybe associated with a set, defined in the SETS data structure 204, by means of an identifier herein called SET ID 208. A column also may be associated with a name 209. As indicated by an arrow 204a, the COLUMNS data structure logically, directly references the SETS data structure, because the COLUMNS data structure may utilize the identifiers of sets. If, for example, each color of the set called COLORS comprises another property, say RGB value, there may possibly be added an entry comprising the following values: '1', '4', 'RGB'. At such a level of the system types of respective data such as text, integer, BLOB may not be considered as their application in the present system is routine work.

Referring back to an example from FIG. 1, there may be three columns wherein each column is associated with a textual identifier "NAME" 209. However, as can be readily seen by respective set identifiers, each column may be associated using a different set, which corresponds to an arrangement of FIG. 1.

Having defined data structures of SETS and COLUMNS there may be defined objects that may form elements of respective SETS and may have properties defined by the COLUMNS data structure. Objects may be held in the OBJECTS 201 data structure. The OBJECTS 201 data structure may hold entries uniquely identified with an identifier ID 203 and associated with a set, defined in the SETS data structure 204, by means of an identifier herein called SET ID 202. As indicated by an arrow 201a, the OBJECTS data structure logically, directly references the SETS data structure, since, for example, the SETS data structure utilizes identifiers of sets.

Referring back to an example from FIG. 1 there are ten objects in the database, namely three colors, four materials and three tools. Hence, the OBJECTS data structure 201 may comprise ten objects, which may correspond to the data of the relational database presented in FIG. 1.

A fourth core data structure is a data structure that may hold data entries of each property of each object. This data structure has been identified as CHARACTERISTICS 301 in FIG. 2. This may be a fundamental difference from known databases in which there are rows of data that comprise entries for all columns of a data table. Each property of an object is stored as a separate entry, which may greatly improve scalability of the system and allow for example adding object properties in real time.

The CHARACTERISTICS 301 data structure may hold entries uniquely identified using an identifier OBJECT ID 302 and maybe associated with a property, defined in the COLUMNS data structure 206, by means of an identifier herein referred to as COLUMNID 303. Further each entry in the CHARACTERISTICS data structure, may comprise a value of a given property of the particular object. As indicated by respective arrows originating from sources A and B, the CHARACTERISTICS data structure 301 logically, directly references the COLUMNS data structure and the OBJECTS data structure, because CHARACTERISTICS data structure 301 uses the identifiers from the respective data structures. Characteristics data structure 301 includes a VALUE property 304, such as black, white, red, rubber, plastic, wood, metal, axe, scythe, and hoe.

Referring back to an example from FIG. 1 there are ten characteristics that may result from the notion that in the example of FIG. 1 there are three colors, four materials and three tools. By way of a non-limiting example, one can easily recognize that the BLACK color refers to an object having ID of 1 and to property having ID of 1. By using these identifiers, for example, one may determine that the property description is "NAME" and that the object belongs to the set, whose description is "COLORS".

A fifth core data structure, of the databases system according to particular embodiments, may be operator function to hold data regarding relations present in the database. This data structure has been referred to herein as RELATIONS 305. This may be a simple structure and, in principle, may hold an identifier of a relation ID 307 and additionally hold a textual description of the relation i.e. a NAME 306. As indicated by an arrow 305*a*, the RELATIONS data structure may logically, directly references downwards the OBJECTS RELATIONS data structure, because the OBJECTS RELATIONS may use the identifiers of the relations.

Referring back to mind maps, for example, a relation present in the RELATIONS 305 data structure, may be directly mapping to a branch between two nodes of a mind map. A relation may be of different types, however in certain embodiments, as in typical mind maps, a relation may be provided with a textual description.

The last core data structure of the present embodiment may be the mentioned OBJECTS RELATIONS data structure 308. This data structure may be designed to provide mapping between a relation from the RELATIONS data structure 305 and two objects from the OBJECTS data structure 301. For example a first entry in the OBJECTS RELATIONS data structure 308 defines that a relation having identifier of 1 exists between object having an identifier of 1 and an object having an identifier of 6. Referring to FIG. 1 this may be an exact definition that a material of wood has color of black, which is defined, in relational database systems, by the intermediary relation table 110*a* (not shown in details). OBJECT RELATIONS data structure 308 includes Object ID columns 309, Object ID column 310, and Relation ID column 311.

In certain embodiments, a seventh data structure may exist in a database system. This data structure may hold data regarding relations between respective data sets and in FIG. 3 may be referred to as SETS RELATIONS 312. This data structure may function or operate to provide mapping between a relation from the RELATIONS data structure 305 and two sets from the SETS data structure 204. For example, a first entry in the SETS RELATIONS data structure 312 may define that the relation having identifier of 1 may exist between a set having an identifier of 1 and a set having an identifier of 2. Providing an entry in the SETS RELATION data structure 312 between a set having an identifier of 1 and a set having an identifier of 2 as well as between a set having an identifier of 2 and a set having an identifier of 1, may allow for creating a bidirectional relation.

There is also a possibility of self-referencing from a given set. For example, such case may be present when there is a set of persons and there exists a student-teacher relation between persons assigned to a particular set.

As described, for example, a relational database system of 100 tables may, in one possible example implementation, be stored in the six above-described data structures. Naturally, most of the data may be kept in the OBJECTS and CHARACTERISTICS data structures.

Figure 4:
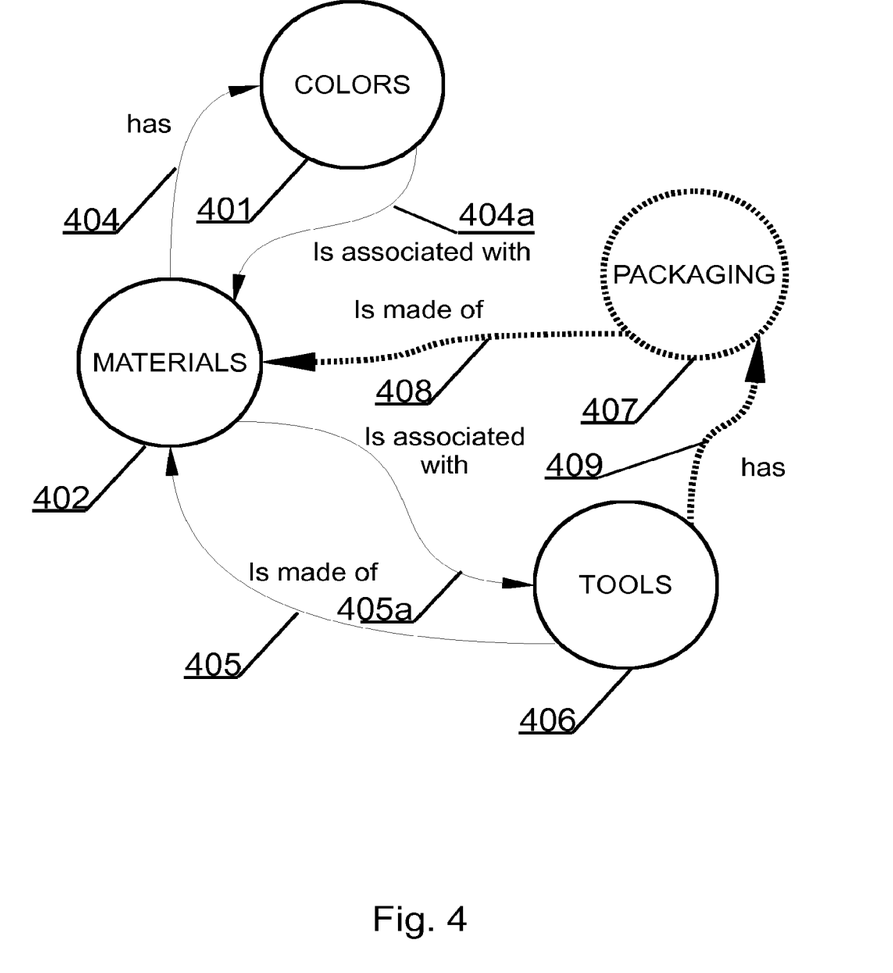
FIG. 4 depicts a mind map that represents database of FIG. 2 and FIG. 3.

FIG. 4 depicts a mind map that represents the database of FIG. 2. There are three nodes that may represent sets of data, namely COLORS 401, MATERIALS 402 and TOOLS 406. A mind map may additionally define branches between respective nodes. Taking into account the relational database of FIG. 1 which may be defined according to the new database system in FIG. 2, there are four branches. A first branch 404 of the mind map is defined between COLORS 401 and MATERIALS 402 and may imply that a MATERIAL may have a COLOR. A second branch 404*a* of the mind map may be defined between COLORS 401 and MATERIALS 402 and may imply that a COLOUR may be associated with a MATERIAL.

Similar to the first two branches, a third branch 405 of the mind map is defined between MATERIALS 402 and TOOLS 406 and may imply that that a TOOL may be made of a MATERIAL. A fourth branch 405*a* of the mind map may be defined between MATERIALS 402 and TOOLS 406 and may imply that a MATERIAL may be associated with a TOOL.

Figure 3:
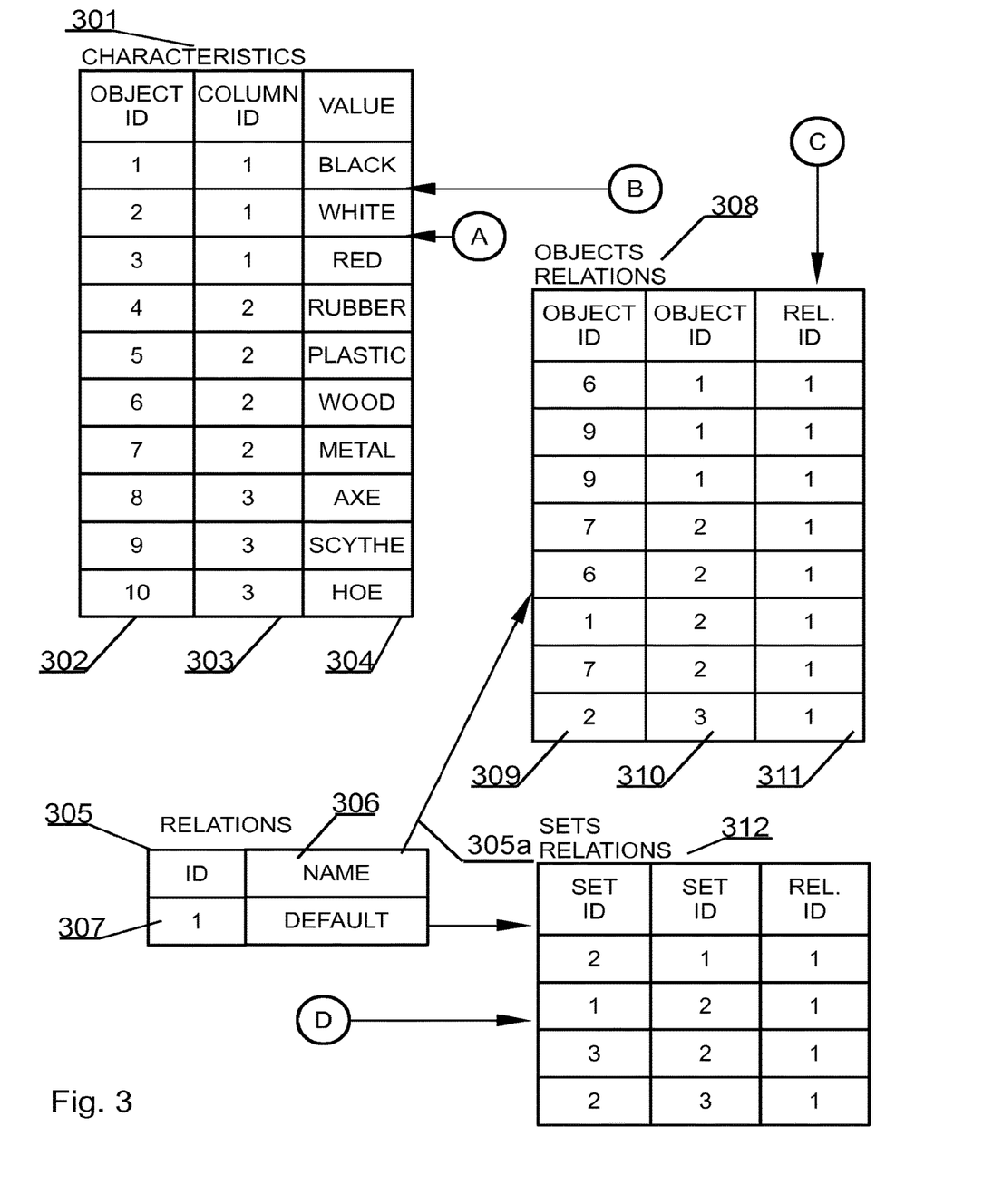

The concept of FIG. 1 may be further expanded in FIG. 3 to also encompass a possibility that a tool may have 409 its packaging 407 and the packaging is made of some materials 408.

In particular embodiments, because all identifiers may be generated automatically, during creation of the database system of FIG. 2 one may start from the mind map presented in FIG. 4. For each node a designer may create a name of a set and properties of the objects that may be kept in the set. Similarly, the designer may create branches as relations between respective nodes, such as data sets. Based on such mind map definition the system of FIG. 2 may be automatically generated from the mind map of FIG. 4. In particular embodiments there may additionally be a process of assigning properties to each node of the mind map wherein each property is an entry in the second data structure, such as the COLUMNS data structure.

Figure 5:
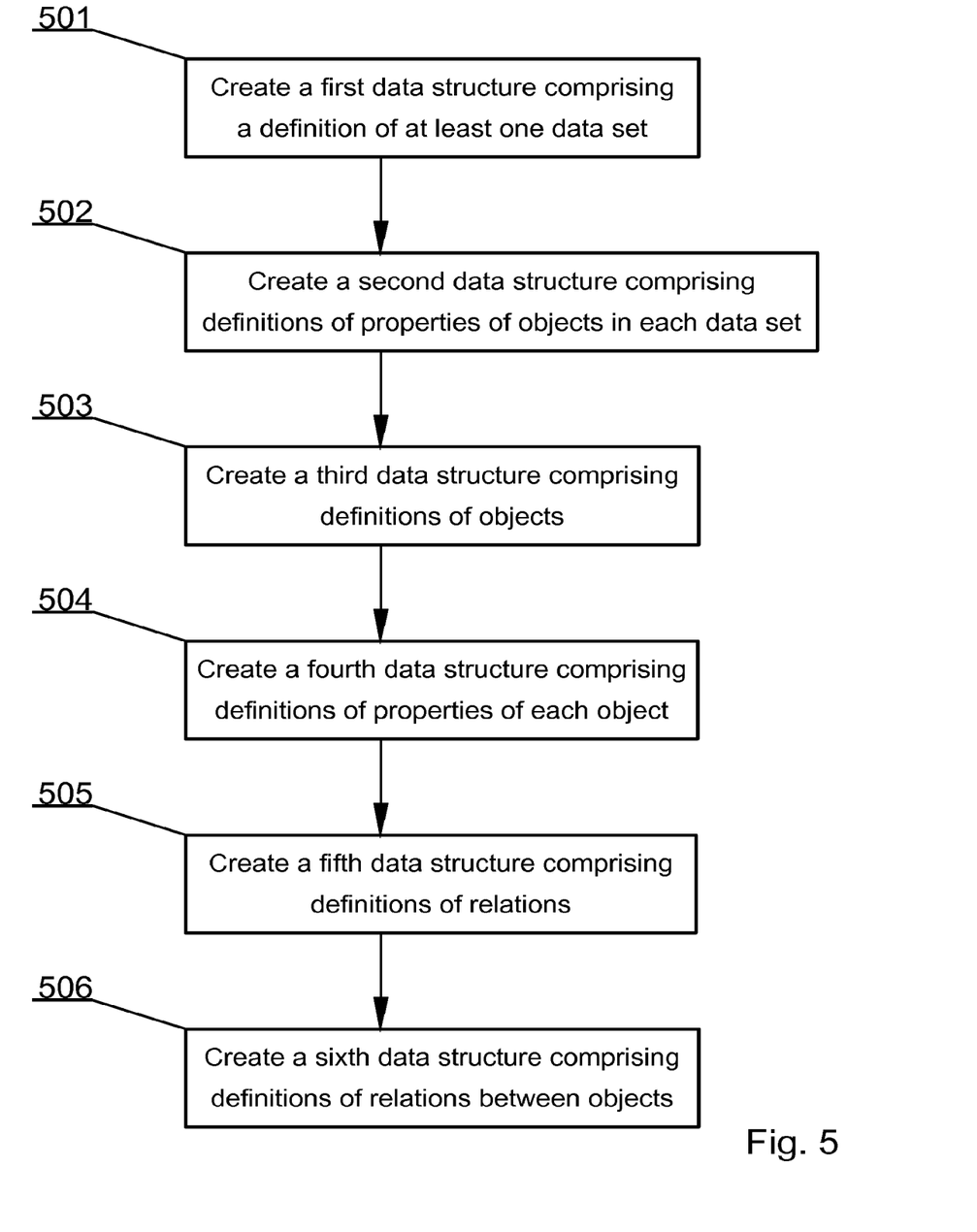
FIG. 5 shows a method for creation of a database system.

FIG. 5 shows a method for creation of database system. A computer implemented method may store data in a memory and comprises the following blocks or actions. At block 501 a first data structure may be created and stored in a memory, wherein a first data structure may comprise a definition of at least one data set wherein each data set comprises a data set identifier and logically may hold data objects of the same type. Next, at block 502, a second data structure may be created and stored in the memory, the second data structure may comprise definitions of properties of objects, wherein each property may comprise an identifier of the property and an identifier of a set to which the property is assigned.

Further, at block 503, a third data structure may be created and stored in the memory, the third data structure comprising definitions of objects wherein each object comprises an identifier and an identifier of a set the object is assigned to. At block 504 a fourth data structure is created and stored in the memory, the fourth data structure may comprise definitions of properties of each object wherein each property of an object associates a value with an object and a property of the set to which the object is assigned. Next at block 505 a fifth data structure is created and stored in the memory, the fifth data structure may comprise definitions of relations wherein each relation comprises an identifier of the relation. Finally, at block 506 a sixth data structure may be created and stored in the memory, the sixth data structure comprising definitions of relations between objects wherein each objects relation associates a relation from the fifth data structure to two objects from the third data structure.

Figure 6:
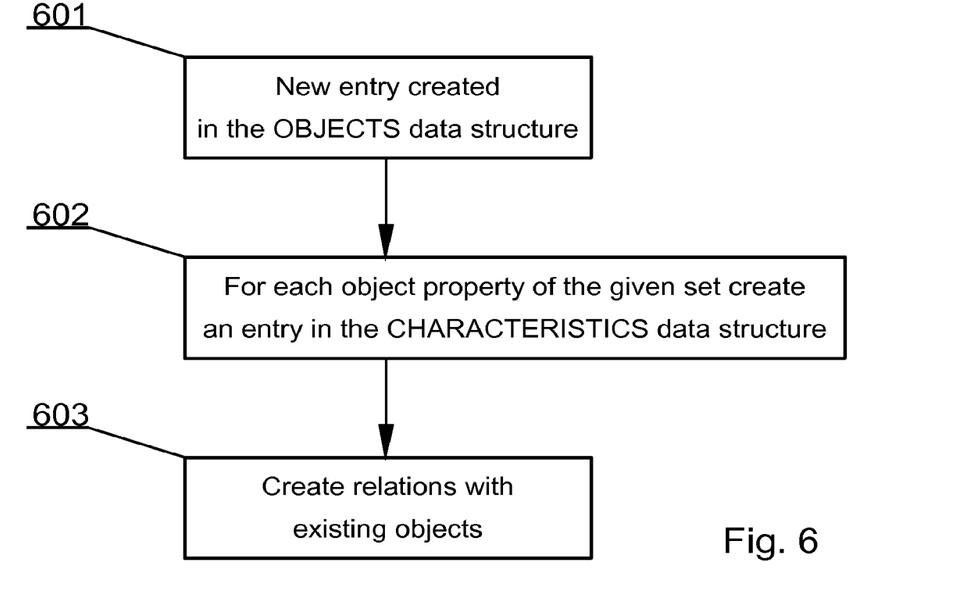
FIG. 6 presents a method of adding objects to the database system.

Taking into account the database system according to particular embodiments, such as the embodiment of FIG. 2, a process of adding an object (a record) to the database may be outlined as follows with reference to FIG. 6. First a new entry is created 601 in the OBJECTS data structure 201. The object is therefore assigned to a given data set defined by the SETS data structure 204. At 602, for each object property of the given set defined in the COLUMNS data structure 206, there is created an entry in the CHARACTERISTICS data structure 301. Subsequently there may be created relations 603 of the new object with existing objects by means of the OBJECTS RELATIONS data structure.

Figure 7:
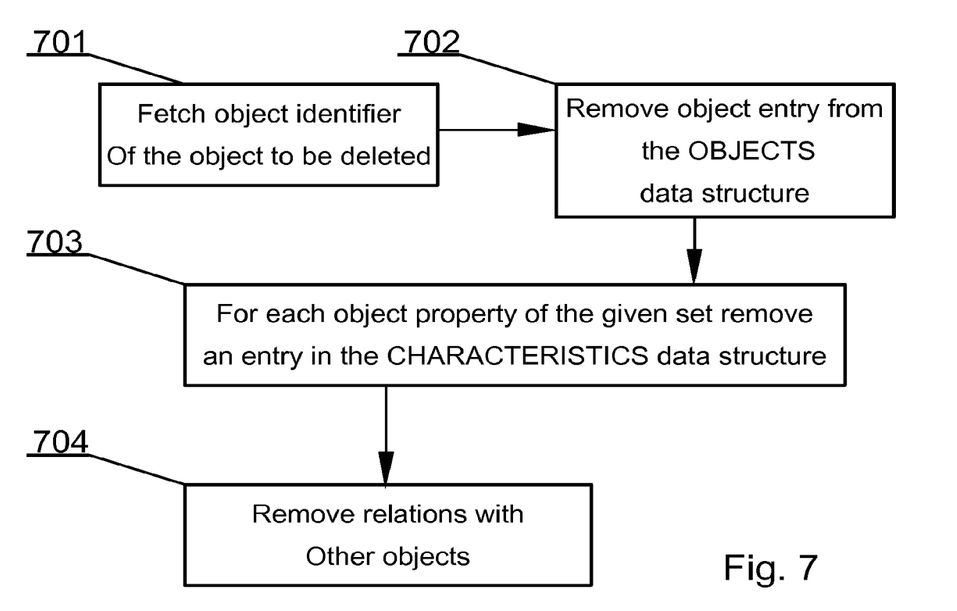
FIG. 7 presents a method of removing objects from the database system.

FIG. 7 presents a method of removing objects from the database system. First an object to be removed may be identified and its corresponding unique identifier is fetched 701. Next, at block 702, the object entry may be removed from the OBJECTS data structure. The object is therefore removed from a given data set defined by the SETS data structure 204. Because properties of each object are stored separately, the next block 703 is to, for each object property of the given set defined in the COLUMNS data structure 206, there is removed an entry in the CHARACTERISTICS data structure 301 related to the object identifier being removed from the database. Subsequently there are removed any existing relations 704 of the removed object with other existing objects by means of deleting entries in the OBJECTS RELATIONS data structure that related to the object being removed.

Figure 8:
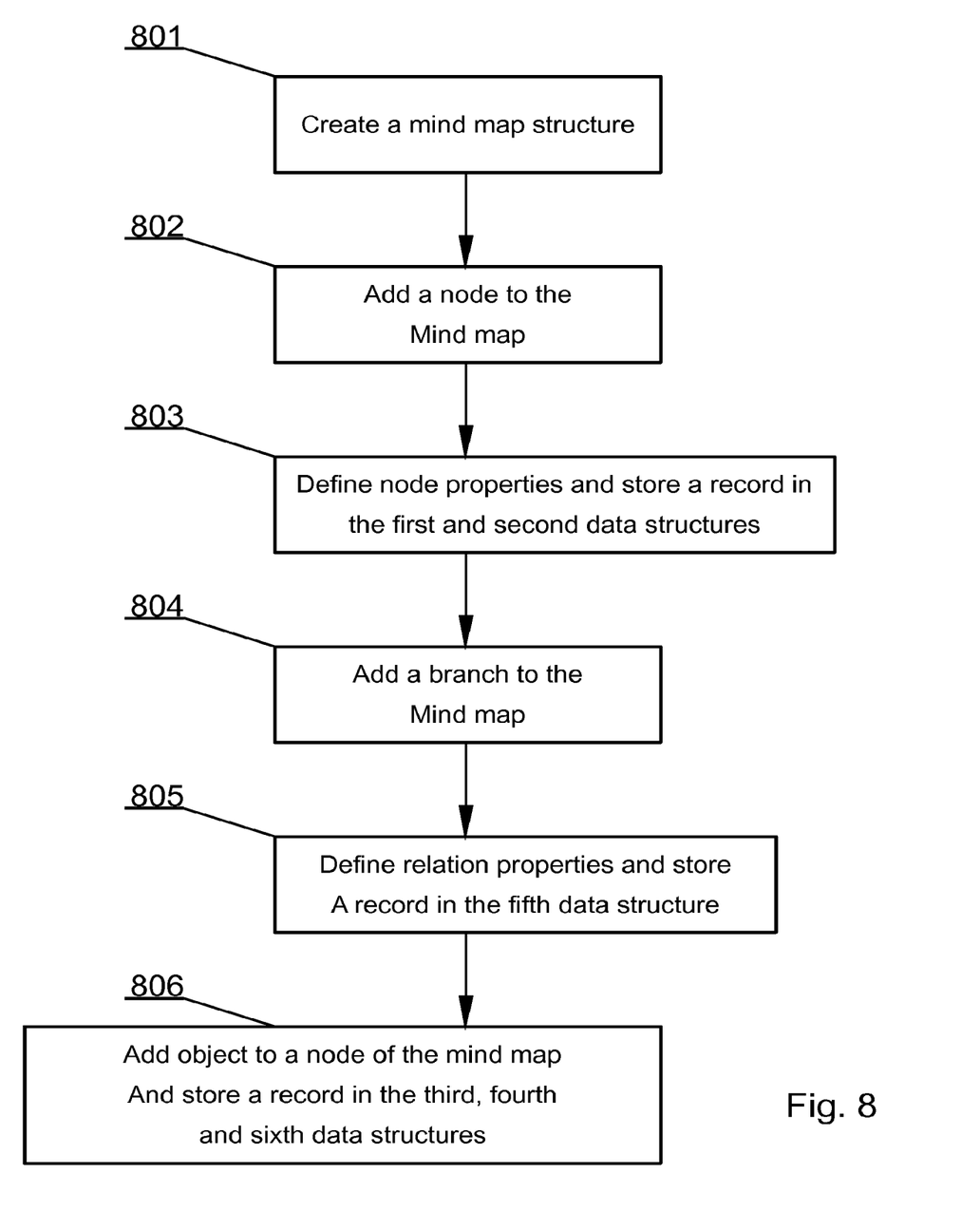
FIG. 8 presents a method for creation of a database system using a mind map.

FIG. 8 presents a method for creation of the database system using a mind map. The first block 801 may be to create a mind map structure. Defining a database system using a mind map may be beneficial and allows a designer to more easily see the big picture in very complex database arrangements. A designer may further gain an ability to visualize organization a database sets and relations that may exist between the respective data sets.

At block 802 of the procedure, a new node may be added to the mind map structure. This is typically executed by using graphical user interface by a database designer. A node of a mind map represents a set as defined with reference to FIG. 2. Therefore it may be advantageous at this point to define, preferably using the graphical user interface, properties associated with the set associated with this particular node of the mind map. The next block 803 may be executed to store a record in the first and second data structures, which are SETS data structure 204 and COLUMNS data structure 206 of FIG. 2 respectively.

The next block 804 may be to create a branch within the mind map. A branch may start at a node of the mind map and end at the same node of the mind map to define a self-relation. For example, there may be a set of users for which there exists a hierarchy among users. Alternatively a branch may start at a node of the mind map and end at a different node, for example, of the mind map to define a relation between different nodes i.e. different sets of objects of the same kind.

The next block 805 is executed to store a record in the fifth data structure, which is RELATIONS data structure 305 of FIG. 3.

The last block of the procedure 806 is to add at least one object to existing data sets i.e. nodes of the mind map. In embodiments, a way of adding objects to mind map nodes may be by way of a graphical user interface. For example by choosing an option to add an object a user may be presented with a set of properties that may be set for the new object. The properties may be defined in the COLUMNS data structure 206 of FIG. 2. After the user provides an input, an object is added to the selected node of the mind map by storing one or more records in the third, fourth, and sixth data structures that are the OBJECTS data structure 201, the CHARACTERISTICS data structure 301 and OBJECTS RELATIONS data structure 308 of FIGS. 2 and 3 respectively.

Lastly, referring back to the problem of disadvantageous effects of ALTER and LOCK commands and the problem of it being beneficial to create a database system that does not require stopping the aforementioned services when for example a new column is to be added to an existing table.

Particular embodiments of claimed subject matter may realize a database structure from a logical standpoint that is a type of is a kind of transposition of certain database structures. For example, addition of a new column to a table instead of modifying physical structure of a table may be representative of an operation of adding a new entry in the 206 structure, which may not require any kind of locking. Another advantage of particular embodiments of a database system is that an addition of a column to a table is much quicker than in prior art database systems since all processing is faster that invoking the known LOCK/ALTER commands. The aforementioned advantages are obtainable due to a specific arrangement of database metadata as shown in FIG. 2 and FIG. 3.

It can be easily recognized, by one skilled in the art, that the aforementioned computer-implemented method and system for creating and managing a database may be performed and/or controlled by one or more computer programs. Such computer programs are typically executed by utilizing the computing resources in a computing device such as personal computers, personal digital assistants, cellular telephones, receivers and decoders of digital television or the like. Applications are stored in non-volatile memory, for example a flash memory or volatile memory, for example RAM and are executed by a processor. These memories are exemplary recording media for storing computer programs comprising computer-executable instructions performing all the steps of the computer-implemented method according the technical concept presented herein.

While the system and method presented herein have been depicted, described, and have been defined with reference to particular preferred embodiments, such references and examples of implementation in the foregoing specification do not imply any limitations. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

I claim:

1. A computer implemented method for adding a new object to a database system, comprising:
   (a) providing a database comprising:
      a first data structure, stored in a memory, comprising a definition of data sets in the database, wherein an entry of the first data structure comprises a unique data set identifier and a set name;
      a second data structure, stored in the memory, comprising definitions of properties of objects in the database, wherein an entry of the second data structure comprises a unique identifier of the property and a data set identifier, from the first data structure, the property is assigned to;
      a third data structure, stored in the memory, comprising definitions of objects of the data sets in the database, wherein an entry of the third data structure comprises a unique object identifier and a data set identifier, from the first data structure, the object is assigned to;
a fourth data structure, stored in the memory, comprising definitions of object values of the data sets in the database, wherein an entry of the fourth data structure comprises an object identifier, from the third data structure, an identifier of a property of the data set, from the second data structure, the object value is assigned to, and the object value;
a fifth data structure, stored in the memory, comprising definitions of relations of data sets in the database, wherein an entry of the fifth data structure comprises a unique identifier of the relation and a name of the relation; and
a sixth data structure, stored in the memory, comprising definitions of objects relations between the objects in the database, wherein an entry of the sixth data structure comprises an identifier of a relation, from the fifth data structure, and two object identifiers from the third data structure;
(b) creating a new entry in the third data structure associated with the new object, wherein the new entry comprises a unique object identifier for the new object and a data set identifier, from the first data structure, the new object is assigned to;
(c) for each object property of a given set defined in the second data structure, creating an object value entry in the fourth data structure, wherein the object value entry comprises a unique object identifier for the new object; and
(d) creating relations of the new object with existing objects in the sixth data structure.

2. The computer implemented method of claim 1, wherein the database further comprises a seventh data structure, stored in the memory, comprising definitions of set relations between data sets in the database, wherein an entry of the seventh data structure comprises an identifier of a relation, form the fifth data structure, with two set identifiers from the first data structure.

3. The computer implemented method of claim 2, wherein the first data structure comprises a reference to the seventh data structure.

4. The computer implemented method of claim 1, wherein the second data structure comprises a reference to the fourth data structure.

5. The computer implemented method of claim 1, further comprising assigning a property type name to each entry in the second data structure and in the data structure.

6. The computer implemented method of claim 1, wherein the data structures are created based on a mind map structure wherein each node of the mind map represents a set in the first data structure and each direct link represents a relation in the fifth data structure of the database.

7. The computer implemented method of claim 6, further comprising:
assigning a name to each node of the mind map wherein each name of a respective node is the name property of a record of the first data structure; and
assigning a name to each direct link of the mind map wherein each name of a respective link is the name property of the fifth data structure.

8. The computer implemented method of claim 6, further comprising:
assigning properties to each node of the mind map wherein each property is an entry in the second data structure.

9. The computer implemented method of claim 1, wherein the first data structure has definitions of a first property type and a second property type that are different from one another.

10. The computer implemented method of claim 9, wherein the relations defined in the fifth data structure include a relation from the first property type to the second property type, or vice versa.

11. A computer program comprising program code means for performing all the steps of the computer-implemented method according to claim 1 when said program is run on a computer.

12. A computer readable medium storing computer-executable instructions performing all the steps of the computer-implemented method according to claim 1 when executed on a computer.

13. A computer implemented method for removing an object from a database system, comprising:
(a) providing a database comprising:
a first data structure, stored in a memory, comprising a definition of data sets in a database, wherein an entry of the first data structure comprises a unique data set identifier and a set name;
a second data structure, stored in the memory, comprising definitions of properties of objects in the database, wherein an entry of the second data structure comprises a unique identifier of the property and a data set identifier, from the first data structure, the property is assigned to;
a third data structure, stored in the memory, comprising definitions of objects of the data sets in the database, wherein an entry of the third data structure comprises a unique object identifier and a data set identifier, from the first data structure, the object is assigned to;
a fourth data structure, stored in the memory, comprising definitions of object values of the data sets in the database, wherein an entry of the fourth data structure comprises an object identifier, from the third data structure, an identifier of a property of the data set, from the second data structure, the object value being assigned to, and the object value;
a fifth data structure, stored in the memory, comprising definitions of relations of data sets in the database, wherein an entry of the fifth data structure comprises a unique identifier of the relation and a name of the relation; and
a sixth data structure, stored in the memory, comprising definitions of objects relations between the objects in the database, wherein an entry of the sixth data structure comprises an identifier of a relation, from the fifth data structure, and two object identifiers from the third data structure;
(b) identifying an object to be removed from the database; and
(c) removing any existing relations of the object to be removed with other existing objects by deleting entries in the sixth data structure that relate to the object being removed.

14. The computer implemented method of claim 13, wherein the database further comprises a seventh data structure, stored in the memory, comprising definitions of set relations between data sets in the database, wherein an entry of the seventh data structure comprises an identifier of a relation, form the fifth data structure, with two set identifiers from the first data structure.

15. The computer implemented method of claim 13, further comprising assigning a property type name to each entry in the second data structure and in the fifth data structure.

16. The computer implemented method of claim 13, wherein the data structures are created based on a mind map structure wherein each node of the mind map represents a set in the first data structure and each direct link represents a relation in the fifth data structure of the database.

17. The computer implemented method of claim 13, wherein the first data structure has definitions of a first property type and a second property type that are different from one another.

18. The computer implemented method of claim 17, wherein the relations defined in the fifth data structure include a relation from the first property type to the second property type, or vice versa.

19. A computer program comprising program code means for performing all the steps of the computer-implemented method according to claim 13 when said program is run on a computer.

20. A computer readable medium storing computer-executable instructions performing all the steps of the computer-implemented method according to claim 13 when executed on a computer.

* * * * *